United States Patent [19]

Richmann et al.

[11] Patent Number: 5,248,388

[45] Date of Patent: * Sep. 28, 1993

[54] USE OF SURFACTANTS HAVING AN HLB LESS THAN 10 IN THE DEINKING OF DRY TONER ELECTROSTATIC PRINTED WASTEPAPER

[75] Inventors: Sandra K. Richmann, Jacksonville Beach; Mary Beth Letscher, Jacksonville, both of Fla.

[73] Assignee: Betz PaperChem, Inc., Jacksonville, Fla.

[*] Notice: The portion of the term of this patent subsequent to Apr. 6, 2010 has been disclaimed.

[21] Appl. No.: 871,362

[22] Filed: Apr. 20, 1992

Related U.S. Application Data

[63] Continuation-in-part of Ser. No. 691,201, Apr. 25, 1991, Pat. No. 5,200,034.

[51] Int. Cl.$^5$ ................................................ D21C 5/02
[52] U.S. Cl. ................................................ 162/5; 162/8
[58] Field of Search ................................ 162/5, 8

[56] References Cited

U.S. PATENT DOCUMENTS

| | | | |
|---|---|---|---|
| 3,501,373 | 3/1970 | Illingworth | 162/5 |
| 3,635,789 | 1/1972 | Green | 162/5 |
| 3,764,460 | 10/1973 | Miyamoto et al. | 162/5 |
| 4,162,186 | 7/1979 | Wood et al. | 162/8 |
| 4,231,841 | 11/1980 | Calmanti et al. | 162/8 |
| 4,276,118 | 6/1981 | Quick | 162/5 |
| 4,360,439 | 11/1982 | Calmanti et al. | 162/5 |
| 4,376,011 | 3/1983 | Menschhorn et al. | 162/5 |
| 4,518,459 | 5/1985 | Freis et al. | 162/5 |
| 4,561,933 | 12/1985 | Wood et al. | 162/5 |
| 4,586,982 | 5/1986 | Poppel et al. | 162/5 |
| 4,643,800 | 2/1987 | Maloney et al. | 162/5 |
| 4,666,558 | 5/1987 | Wood et al. | 162/8 |
| 4,710,267 | 12/1987 | Elsby et al. | 162/8 |
| 4,820,379 | 4/1989 | Darlington | 162/5 |
| 4,959,123 | 9/1990 | Lehmann et al. | 162/8 |
| 5,102,500 | 4/1992 | Darlington | 162/5 |

FOREIGN PATENT DOCUMENTS

| | | |
|---|---|---|
| 0307024 | 3/1989 | European Pat. Off. |
| 3031804 | 3/1976 | Japan ........ 162/5 |

OTHER PUBLICATIONS

Darlington, W. B., "A New Process for Deinking Electrostatic-Printed Secondary Fiber", *TAPPI Proceedings*, 1988 Pulping Conference, pp. 95–100.

*Primary Examiner*—Karen M. Hastings
*Attorney, Agent, or Firm*—Alexander D. Ricci; Richard A. Paikoff

[57] ABSTRACT

A method for deinking dry toner electrostatic printed wastepaper is disclosed. The method comprises administering a sufficient amount of a surfactant with a hydrophile/lipophile balance of from about 0.5 to 10.0 to a sample of electrostatic printed wastepaper for which treatment is desired.

13 Claims, No Drawings

USE OF SURFACTANTS HAVING AN HLB LESS THAN 10 IN THE DEINKING OF DRY TONER ELECTROSTATIC PRINTED WASTEPAPER

This application is a continuation-in-part of Ser. No. 07/691,201 filed Apr. 25, 1991, now U.S. Pat. No. 5,200,034.

BACKGROUND OF THE INVENTION

Dry toner electrostatic printing inks, including laser and xerographic inks, are important and growing contaminants in the area of waste paper recycling. Traditionally, paper has been printed with water or oil-based inks which were adequately removed by conventional deinking procedures. In these methods, secondary fiber is mechanically pulped and contacted with an aqueous medium containing a surfactant. Ink is separated from pulp fibers as a result of mechanical pulping and the action of the surfactant. The dispersed ink is separated from pulp fibers by such means as washing or flotation.

Conventional deinking processes have shown minimal success in dealing with dry toner electrostatic printing inks, with the necessary chemical and mechanical treatments of the furnish proving to be time consuming and often rendering a furnish which is unacceptable for many applications. The development of a deinking program for office waste contaminated with electrostatic printed copy will make this furnish more amenable to the recycling process.

The ability to recycle office waste will prove commercially advantageous and will have a significant impact on the conservation of virgin fiber resources. Although electrostatic printed waste has not reached the volume of impact printed waste commonly seen in the industry, indications are such that usage of electrostatic print is increasing steadily and that waste copies available to the recycling industry will also increase.

The present invention enhances the aggregation and subsequent removal of electrostatic toner particles through centrifugal cleaners by using specific commercially available raw materials. This can be accomplished at a wide range of pH levels (5.0 to 11.0) and will render a furnish that is virtually free of electrostatic printing ink after subsequent mechanical treatment. The invention allows for the separation of ink particles and associated binder from pulp fibers, and causes the particles to aggregate to a critical range of size and density, which affords their most efficient removal from the pulp slurry by centrifugal cleaners.

The present invention demonstrates that specific surfactants with low HLBs enhance the aggregation of electrostatic toner particles, allowing removal through centrifugal cleaning and/or screening. HLB is an abbreviation for hydrophile-lipophile balance as related to the oil and water solubility of a material. A high HLB indicates that the hydrophilic portion of the molecule is dominant, while a low HLB indicates that the hydrophobic portion of the molecule is dominant. The water solubility of materials increases with increasing HLB. Traditional deinking processes utilize a wide variety of high HLB (generally greater than 10) nonionic and/or anionic surfactants or dispersants to wet and disperse ink particles to a range of size (about 0.5 to 15 microns) which allows for their most efficient subsequent removal by washing and/or froth flotation processes.

Aggregation is seen at pH levels ranging from 5.0 to 11.0, with no significant deposition of ink present on pulping equipment. The advantage of the present invention is that it allows for aggregation at an ambient pH, alleviating the need for caustic or acid tanks in the mill environment.

SUMMARY OF THE INVENTION

The components of the present invention comprise individual surfactants with hydrophile/lipophile balances of from about 0.5 to 10.0. These components will also be effective when combined with aliphatic petroleum distillates (solvents). (The solvents are saturated hydrocarbons having carbon numbers in the range of C9-C12). All components are commercially available.

DETAILED DESCRIPTION OF THE INVENTION

The present inventors have discovered that the addition to an aqueous slurry of electrostatic printed wastepaper of a surfactant with a hydrophile/lipophile balance of from about 0.5 to 10.0 significantly enhances the aggregation of electrostatic toner particles, allowing for their separation from fiber through centrifugal cleaning and/or screening. This aggregation takes place at pH levels ranging from about 5.0 to 11.0, with no significant deposition of ink present on pulping equipment. (A pH higher than 11.0 or lower than 5.0 is also believed to be effective).

During initial testing, the phenomenon was termed agglomeration (i.e., a bringing together of particles, the surface area of the whole remaining the sum of each individual part). The inventors now feel that a more accurate term to describe the phenomenon is aggregation (i.e., a changing of surface area, the total surface area being less than the sum of the individual particles). Aggregation is a result of this densification, or reduction of void areas.

The individual surfactants (e.g., ethoxylated, propoxylated, ethoxylated/propoxylated, esterified or alkanolamide) allow for aggregation at an ambient pH, alleviating the need for caustic or acid tanks in the mill environment. The raw materials which are effective in this invention include:

1. Alkylphenol ethoxylates
2. Block copolymers of ethylene oxide and propylene oxide
3. Alcohol ethoxylates
4. Glycerol esters
5. Alkoxylated fatty esters
6. Sorbitan esters
7. Fatty acid alkanolamides
8. Amine ethoxylates
9. Dimethylpolysiloxane alkoxylates The chemical structures of the raw materials are as follows:

---

Alkylphenol ethoxylates

Ethoxylated Octylphenols
$C_8H_{17}-C_6H_4O(CH_2CH_2O)_nH$
n = 1-6

Ethoxylated Nonylphenols
$C_9H_{19}-C_6H_4O(CH_2CH_2O)_nH$
n = 1-6

Dodecylphenol Ethoxylates
$C_{12}H_{25}-C_6H_4O(CH_2CH_2O)_nH$
n = 1-6

Dialkylphenol Ethoxylates

-continued

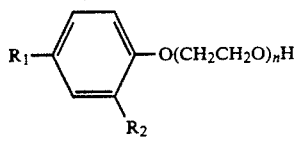

n = 1–9
$R_1, R_2 = C_8H_{17}, C_9H_{19}$ or $C_{12}H_{25}$
Block copolymers of ethylene oxide and propylene oxide
Ethoxylated Polyoxypropylene Glycols $$HOCH_2CH_2(CH_2CH_2O)_n(CH_2\overset{CH_3}{\underset{|}{C}}HO)_m(CH_2CH_2O)_nCH_2CH_2OH$$

n = 1–45
m = 14–77
Propoxylated Polyoxyethylene Glycols $$HOCH_2\overset{CH_3}{\underset{|}{C}}HO(CH_2\overset{CH_3}{\underset{|}{C}}HO)_n(CH_2CH_2O)_m(CH_2\overset{CH_3}{\underset{|}{C}}HO)_nCH_2\overset{CH_3}{\underset{|}{C}}HOH$$

n = 14–77
m = 1–45
Alcohol Ethoxylates
Primary Alcohol Ethoxylates
$CH_3-(CH_2)_x-CH_2O(CH_2CH_2O)_nH$
x = 4–16
n = 1–10
Secondary Alcohol Ethoxylates

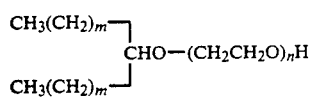

n = 1–8
m = 9–12
Glycerol Esters
Glycerol Esters of Fatty Acids

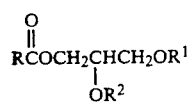

R, $R^1$, $R^2$ = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, or iso-stearic
$R^1, R^2 = -H$
Alkoxylated Fatty Esters
Ethoxylated Fatty Esters

n = 1–9
R, $R^1$ = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, or iso-stearic
$R^1 = -H$
Propoxylated Fatty Esters

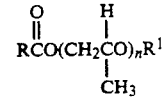

n = 1–10
R, $R^1$ = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, or iso-stearic
$R^1 = H$ Sorbitan Esters

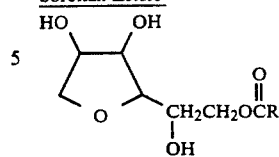

R = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, or iso-stearic
Fatty Acid Alkanolamides
Fatty Acid Diethanolamides

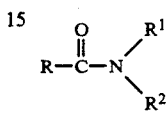

R = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, or iso-stearic
$R^1, R^2 = -H, -CH_2CH_2OH$, or $$-CH_2\overset{|}{\underset{CH_3}{C}}HOH$$

Amine Ethoxylates
Ethoxylated Tertiary Amines

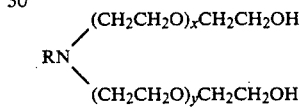

R = caprylic, capric, lauric, myristic, palmitic, palmitoleic, stearic, oleic, linoleic, linolenic, alpha-eleostearic, ricinoleic, gadoleic, arachidonic, behenic, pelargonic, iso-oleic, iso-stearic, or rosin
x = 1–6
y = 1–6

Dimethylpolysiloxane ethoxylates and propoxylates (molecular weight = 600–20,000), as well as sorbitan ester ethoxylates are also anticipated to be effective surfactants in the aggregation of electrostatic toner particles.

For the application of electrostatic toner particle aggregation, the effective hydrophile - lipophile balance of the tested surfactants is from about 0.5 to 10, preferably from about 0.5 to 5. It is believed that the effective temperature range for the aggregation of electrostatic toner particles is from about 110°–190° F.

A beaker test method was utilized to determine the impact of various raw materials on toner aggregation without the presence of fiber. This method allowed for the visual evaluation of toner configuration after treatment and permitted the particles to be sized using the Brinkmann Particle Size Analyzer. When raw materials were screened using this method, those demonstrating significant particle aggregation were advanced to the Dsinking/Repulping Apparatus (the pulper) for an evaluation of performance in the presence of fiber.

The experimental procedure was as follows: Approximately 0.01 grams of toner was added to a beaker containing 100 milliliters of deionized water. Each solution of toner and water was mixed on a magnetic stirrer at a pH of 7.0, a temperature of 150° F. and a contact time of 60 minutes. About 514 parts of raw material per million parts of solution was added to the beaker. Upon completion of contact time, particle configurations were noted, and solutions were filtered and held for size evaluation using the Brinkmann Particle Size Analyzer.

The pulper was then used to evaluate selected raw materials. This apparatus consists of a Waring blender jar with the blades reversed to provide a mixing action of the fibers. The stirring of the blender is controlled by a motor connected to a Servodyne controller. Temperature of the pulp in the blender is provided by a heating mat attached to a temperature controller. The typical furnish consistency in the laboratory pulper is 5%, and a stirring speed of 750 rpm is used to simulate the mechanical action of a hydropulper.

Electrostatic printed wood-free fiber was used as the furnish. Twenty pounds of raw material per ton of fiber were added to the pulper (5-20 pounds material/ton of fiber the preferred range, 10-20 pounds/ton most preferred) at a temperature of 150° F., a pH of 7.0, and a pulping time of 60 minutes. In Table 1, toner particle aggregation or the lack thereof through the use of individual surfactants is listed.

TABLE 1

| FUNCTIONAL GROUP | HLB | TONER PARTICLE APPEARANCE* | Toner Particle Aggregation | |
|---|---|---|---|---|
| Ethoxylated Octylphenols | 3.6 | aggregated | $n = 1.5$ | |
| | 15.8 | no effect | $n = 10.0$ | |
| Ethoxylated Nonylphenols | 4.6 | aggregated | $n = 1.5$ | |
| | 12.9 | no effect | $n = 9.5$ | |
| | 17.2 | no effect | $n = 49$ | |
| Ethoxylated Polyoxypropylene Glycols | 0.5 | aggregated | $n = 9$ | $m = 69$ |
| | 1.0 | aggregated | $n = 13$ | $m = 56$ |
| | 18.5 | no effect | $n = 3$ | $m = 15$ |
| | 1.0 | aggregated | $n = 13$ | $m = 56$ |
| | 12.0 | no effect | $n = 3$ | $m = 16$ |
| Primary Alcohol Ethoxylates | 4.6 | aggregated | $n = 2.0$ $x = 16$ | |
| | 12.2 | no effect | $n = 9.0$ $x = 16$ | |
| | 6.0 | aggregated | $n = 4.0$ $x = 6-8$ | |
| Glycerol Esters of Fatty Acids | 0.8 | aggregated | $R = R' = $ Oleic | |
| | 1.6 | aggregated | $R = $ Oleic, $R' = H$ | |
| | 2.5 | aggregated | $R = $ Oleic, $R' = H$ | |
| | 2.7 | aggregated | $R = $ Oleic, $R' = H$ | |
| | 2.7 | aggregated | $R = $ Stearic, $R' = H$ | |
| | 2.9 | aggregated | $R = $ Isostearic, $R' = H$ | |
| | 2.8 | aggregated | $R, R' = $ Fatty Acid | |
| Ethoxylated Fatty Esters | 8.0 | aggregated | $n = 5$ | $R = $ Oleic, $R' = H$ |
| | 13.5 | no effect | $n = 14$ | $R = $ Oleic, $R' = H$ |
| | 2.0 | aggregated | $n = 1$ | $R = $ Stearic, $R' = H$ |
| | 3.0 | aggregated | $n = 1$ | $R = $ Stearic, $R' = H$ |
| | 18.0 | no effect | $n = 40$ | $R = $ Stearic, $R' = H$ |
| Propoxylated Fatty Esters | 1.8 | aggregated | $R = $ Stearic, $R' = $ H(monoester) | |
| | 1.8 | aggregated | $R = $ Stearic, $R' = $ H & Stearic (at least 95% monoester) | |
| | 3.5 | aggregated | $R = $ Stearic, $R' = $ H & Stearic (at least 67% monoester) | |
| Sorbitan Esters | 1.8 | aggregated | $R = $ Trioleic | |
| | 2.1 | aggregated | $R = $ Tristearic | |
| | 2.7 | aggregated | $R = $ Sesquioleic | |
| | 14.9 | no effect | $R = $ Stearic | |
| Fatty Acid Diethanolamides | 1-7 | aggregated | $R = $ Oleic $R' = H$, $R_2 = \overset{\underset{\displaystyle CH_3}{\mid}}{CH_2CHOH}$ | |
| | >10.0 | no effect | $R = $ Coco $R' = R^2 = CH_2CH_2OH$ | |
| | >10.0 | no effect | $R = $ Coco $R' = R^2 = CH_2CH_2OH$ | |
| Ethoxylated Tertiary Amines | 5.0 | aggregated | $R = $ tallow $x + y = 2$ | |
| | 12.0 | no effect | $R = $ tallow $x + y = 7$ | |
| Organic Phosphate Esters | 13-15 | no effect | | |
| | 13-15 | no effect | | |
| Polyethoxylated and polypropoxylated polydimethyl siloxanes | 5.0 | aggregated | | |
| | 9.0 | aggregated | | |
| | 17.0 | no effect | | |

*aggregation: particle size > approx. 10 microns
no effect: particle size < approx. 10 microns While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A process for the deinking of electrostatic printed wastepaper consisting essentially of adding to an aqueous slurry of the electrostatic printed wastepaper an amount, sufficient for the intended purpose, of a surfactant with a hydrophile/lipophile balance of from about 0.5 to 10, said process enhancing the aggregation of electrostatic toner particles and allowing for the separation of the particles from pulp fibers.

2. The process as recited in claim 1 wherein said surfactant is an ethoxylated surfactant.

3. The process as recited in claim 2 wherein said ethoxylated surfactant is selected from the group consisting of alkylphenol ethoxylates, alcohol ethoxylates, and amine ethoxylates.

4. The process as recited in claim 1 wherein said surfactant is a propoxylated surfactant.

5. The process as recited in claim 1 wherein said surfactant is an ethoxylated/propoxylated surfactant.

6. The process as recited in claim 1 wherein said surfactant is an esterified surfactant.

7. The process as recited in claim 1 wherein said surfactant is an alkanolamide surfactant.

8. The process as recited in claim 1 wherein aliphatic petroleum distillates are combined with the surfactant.

9. The process as recited in claim 8 wherein the aliphatic petroleum distillates are saturated hydrocarbons having carbon numbers in the range of C9–C12.

10. The process as recited in claim 1 wherein aggregation of electrostatic toner particles occurs at a temperature of about 110° F. to 190° F.

11. The process as recited in claim 1 wherein aggregation of electrostatic toner particles occurs at a pH of about 5.0 to 12.0.

12. The process as recited in claim 1 wherein the surfactant has a hydrophile/lipophile balance of from about 0.5 to 5.

13. The process as recited in claim 1 wherein about 5 to 20 pounds of surfactant per ton of fiber is added to the aqueous slurry of electrostatic printed wastepaper.

* * * * *